June 3, 1969  R. A. SCHILBERG  3,447,638
LAMINATED DYNAMIC VIBRATION ABSORBER FOR MOTOR
VEHICLE DRIVE SYSTEM
Filed Jan. 18, 1968
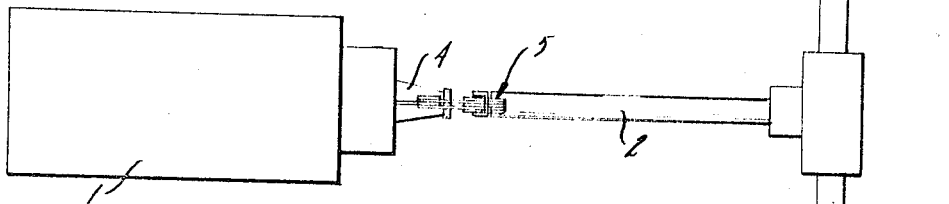
FIG_1
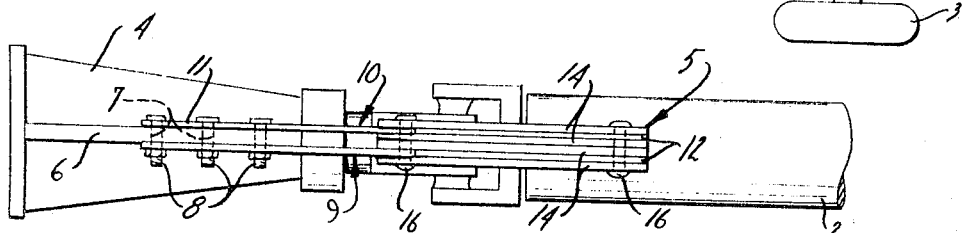
FIG_2
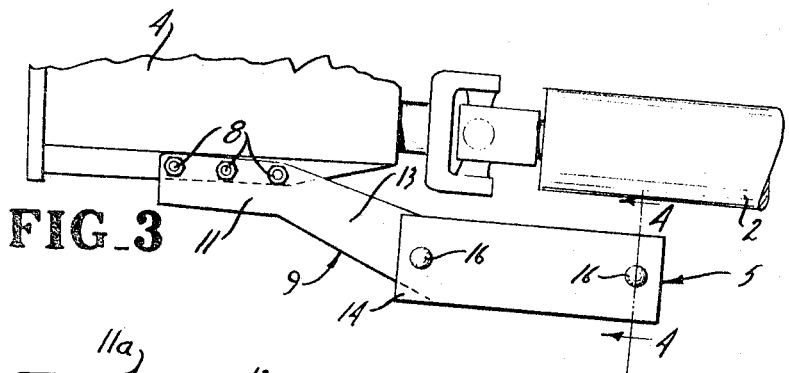
FIG_3
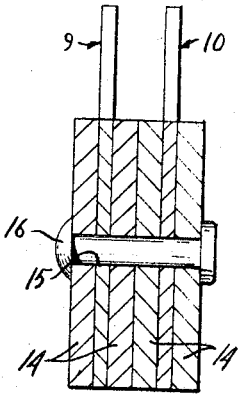
FIG_4
FIG_5
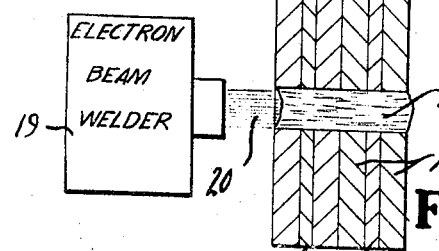
FIG_7
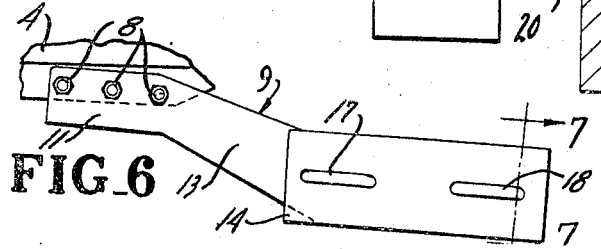
FIG_6
INVENTOR
ROBERT A. SCHILBERG
BY
Andrus & Starke
Attorneys

United States Patent Office 3,447,638
Patented June 3, 1969

3,447,638
LAMINATED DYNAMIC VIBRATION ABSORBER FOR MOTOR VEHICLE DRIVE SYSTEM
Robert A. Schilberg, Mequon, Wis., assignor to A. O. Smith Corporation, Milwaukee, Wis., a corporation of New York
Filed Jan. 18, 1968, Ser. No. 698,768
Int. Cl. F16d 63/00
U.S. Cl. 188—1                    5 Claims

ABSTRACT OF THE DISCLOSURE

A laminated dynamic vibration absorber for a vehicle which includes a pair of laterally spaced flat metal spring arms bolted to a portion of the power-train and drive system of a vehicle and extending outwardly therefrom to provide dynamic vibration absorption. A plurality of flat rectangular metal stampings are interconnected in stacked relationship between and to the outer free ends of the arms with the number of stampings and the configuration thereof selected to establish the desired frequency and mass distribution.

---

This invention relates to a laminated dynamic vibration absorber connected to a vehicle drive system, and particularly to a spring mounted mass secured to a portion of the power-train and drive system of a vehicle to reduce or essentially eliminate the effects of vibrations originating in the power-train and drive system of the vehicle. The particular number and shape of the laminations is selected to obtain specific desired vibration absorbing effects and mass distribution.

The power-train and drive systems of motor vehicles may create undesirable vibration under certain operating conditions. To compensate for, and alleviate the unwanted vibration, it has been known to connect a vibration damping mass to some portion of the power-train and drive system. However, these devices have been fabricated from cold rolled steel cylindrical sections which include a separate, cold rolled steel connecting arm. There is limited design versatility with this construction and an opening is drilled in the end of the cylindrical section to receive the end of the connecting arm, which is secured thereto by welding.

The vibration damping device preferably should be relatively inexpensive, particularly because of the highly competitive nature of marketing in the automotive industry. The device should also have substantial assembly flexibility from the standpoint of mass to permit matching of the mass to the particular vehicle, without requiring tooling changes where possible.

The present invention is particularly directed to a very simple and reliable damping absorber which can be readily constructed to provide any desired mass. The particular mass required can be fabricated at a minimum cost, with no expensive machining or forming operations such as are required in cold rolled type damping absorbers.

Generally, in accordance with the present invention, the dynamic vibration absorber includes a metal spring arm secured to a portion of the power-train and drive system of a vehicle. A plurality of flat stampings are interconnected in stacked relationship to the outer end of the arm with the number of stampings and the configuration thereof selected to establish the desired frequency and mass distribution. The metal stampings may be interconnected to each other and to the arm in any suitable manner including rivets, welds, adhesives and the like. The spring arm with the flat, stamped members eliminates expensive machining and forming operations and provides versatility in the final assembled construction to provide the most desirable damping mass for any one of a wide variety of vehicles, without requiring special tooling.

The drawing furnished herewith illustrates a preferred construction of the present invention having the above advantages and features as well as others which will be clear from the following description of the drawing.

In the drawing:

FIG. 1 is a schematic plan view of an automobile vehicle drive system with the dynamic damping absorber of the present invention connected thereto;

FIG. 2 is an enlarged fragmentary view of the drive system more clearly showing the absorber;

FIG. 3 is a side elevational view of FIG. 2;

FIG. 4 is an enlarged sectional view taken generally on line 4—4 of FIG. 3;

FIG. 5 is a side elevational view of a spring arm shown in FIGS. 1-4;

FIG. 6 is a side elevational view similar to FIG. 2 showing an alternate construction; and FIG. 7 is a vertical section taken generally on line 7—7 of FIG. 6.

Referring to the drawing and particularly to FIG. 1, the present invention is shown in connection with a vehicle having an internal combustion engine 1 which is connected to the forward end of a rearwardly extending drive line system 2 connected to drive the rear wheels 3. The power-train and drive system 2 includes a transmission 4 connected to the back end of the engine 1. A dynamic damping absorber 5, constructed in accordance with the present invention, is interconnected to the underside of the transmission 4 and projects downwardly therefrom. The absorber 5 is spring mounted and absorbs and essentially eliminates objectional vibrations originating in the relatively large mass of the power-train and drive system 2 during the operation of the vehicle.

The power-train and drive system 2 of the vehicle may be any one of a great variety of constructions, and is therefore only shown schematically in the drawing to illustrate one preferred connection of the absorber 5 to the power-train and drive system 2 of a vehicle.

In particular, the transmission 4 is shown having a generally cone-shaped outer housing with a longitudinal rib 6 on the underside thereof to which absorber 5 is secured. In the illustrated embodiment, rib 6 is provided with a plurality of bolt openings 7 and the absorber 5 is secured thereto by a plurality of bolts 8 to provide a firm and rigid interconnection between the absorber 5 and the transmission housing at rib 6.

The absorber 5 which particularly forms the subject matter of the present invention includes a pair of strip mounting spring arms 9 and 19, which are generally identical stamped metal members, as shown in FIG. 5. Each of the spring arms 9 and 10 includes a rectangular mounting end 11 of a somewhat greater depth than that of the rib 6. The upper edge portion is formed or stamped with appropriate bolt hole openings 11a.

The opposite end 12 of arms 9 and 10 is generally a rectangular free mass end offset from the mounting end 11 and interconnected thereto by an interconnecting inclined arm portion 13. With the end 11 secured to rib 6, the mass end 12 is disposed rearwardly of the transmission 4 and beneath the power-train and drive system 2.

In the illustrated embodiment of the invention, a pair of laminate members 14, which generally correspond in thickness to the thickness of the rib 6, are clamped between the two spring arms 9 and 10. Such additional laminate members 14 as are required to produce the desired total mass are secured to the opposite outer sides of the spring arms 9 and 10.

Applicant has found that the dynamic damping absorber 5 provides a very simple and inexpensive means for producing a natural frequency tuning device for attachment to the power-train and drive system 2 of a vehicle to eliminate undesirable vibration. While providing a highly desirable result, the new construction has substantially reduced the cost of the dynamic absorber. Further, the laminated type construction of the present invention also permits readily varying of mass by proper adjustment of the number and configuration of the mass members 14.

An alternative embodiment of the invention is shown in FIGS. 6 and 7 wherein corresponding elements are provided with the same identifying numbers as in FIGS. 1-5 for simplicity and clarity of explanation. The embodiment of FIGS. 6 and 7 particularly show a simple means of connecting the weight members to the spring arms.

The plurality of stampings 14 are secured to the mass end 12 of the spring arms 9 and 10 in the alternative embodiment by a pair of spaced welds 17 and 18.

Electron beam, burn through welds 17 and 18 formed as diagrammatically shown in FIG. 7. An electron beam source 19 is aligned with the weld line and includes deflection means to deflect a welding beam 20 along the weld line to thereby form the final welds 17 and 18 which extend completely through the laminated structure to firmly and positively interconnect the laminate members 14 to the arms 9 and 10. The electron beam welds 17 and 18 provide a highly satisfactory interconnection of the laminate members 14 to each other and to the arms 9 and 10 in which the welds 17 and 18 are at least as strong as the parent metal.

The present invention thus provides a very simple and inexpensive means for obtaining the necessary mass for a vehicle dynamic damping absorber.

I claim:

1. A dynamic vibration damping absorber adapted to be connected to a part of the power-train and drive system of a vehicle, comprising a spring arm means including a laminate metal member having a mounting end adapted to be fixedly secured to a portion of said power-train and drive system and extending therefrom and terminating in an outer free mass end, and a plurality of laminate members connected in stacked relation to the outer end of said arm means, the number of said laminate members being selected to establish a predetermined natural vibration frequency and being free to vibrate to dampen the undesirable vibration of said power-train and drive system.

2. The dynamic damping absorber of claim 1, wherein said arm means includes a pair of similar stamped flat metal members, each member including a mounting end and a mass end offset in the principal plane of the member and connected by an intermediate spring portion, means for securing the mounting end of said flat metal members to the power-train and drive system of said vehicle, and means to rigidly connect said laminate members to the mass ends of said flat metal members to form an essentially single vibratable damping mass.

3. The dynamic damping absorber of claim 1, wherein said power-train and drive system includes an attaching projection, said arm means includes a pair of similar stamped flat metal members, each member including the mounting end and the mass end offset in the principal plane of the member and connected by a spring portion, means for securing the mounting end of the metal members to the opposite sides of said attaching projection, and means to rigidly connect a pair of said laminate members between said mass ends of said arms and additional laminate members to the opposite sides of said mass ends to form an essentially single vibration damping mass.

4. The dynamic absorber of claim 3, wherein said mounting ends having a plurality of bolt openings in the outer portion thereof and said mass ends are generally rectangular, said laminate members being generally rectangular and corresponding to the mass ends.

5. The dynamic damping absorber of claim 1, wherein said power-train and drive system includes a transmission housing having an outer attaching projection thereon, and said arm means includes a pair of similar laminate metal members, each member including ends offset in the principal plane of the member and connected by an intermediate spring portion, bolt means for securing the mass end of the metal members to the opposite sides of said attaching projection, and means to rigidly connect said laminate members to the opposite free end of said metal members to form an essentially unitary, vibration damping mass.

References Cited

UNITED STATES PATENTS

| | | |
|---|---|---|
| 1,945,245 | 1/1934 | Whyte. |
| 2,038,603 | 4/1936 | Roche. |
| 2,541,159 | 2/1951 | Geiger. |
| 2,689,105 | 9/1954 | Zimmer. |
| 2,857,974 | 10/1958 | Heller. |
| 3,102,722 | 9/1963 | Hamontre. |

DUANE A. REGER, *Primary Examiner.*

U.S. Cl. X.R.

180—70